United States Patent [19]

Antisdel et al.

[11] 4,433,484
[45] Feb. 28, 1984

[54] CABLE STRIPPER

[76] Inventors: Gerald L. Antisdel, 1009 Stanley Ave. #5; Robert J. Picard, 1009 Stanley Ave. #4, both of Long Beach, Calif. 90804

[21] Appl. No.: 305,971

[22] Filed: Sep. 28, 1981

[51] Int. Cl.³ .............................................. B21F 13/00
[52] U.S. Cl. .................................................. 30/90.4
[58] Field of Search ....................... 30/90.4, 90.6, 90.7

[56] References Cited

U.S. PATENT DOCUMENTS

| 1,739,972 | 12/1929 | Klinger | 30/90.4 |
| 2,537,287 | 1/1951 | Thomas | 30/90.4 |
| 2,616,172 | 11/1952 | Parking | 30/90.4 |
| 3,092,906 | 6/1963 | Deering | 30/90.6 |
| 3,238,618 | 3/1966 | Cook | 30/90.4 |

FOREIGN PATENT DOCUMENTS 160790 10/1957 Sweden ................................. 30/90.6

Primary Examiner—Frederick R. Schmidt
Assistant Examiner—J. T. Zatarga
Attorney, Agent, or Firm—William C. Babcock

[57] ABSTRACT

A cable stripper, including an elongated handle, a conventional single edge razor blade supported in each opposite end of the handle, one of the blades having an exposed corner of its cutting edge, while the other blade has a portion of its cutting edge inside a groove formed on the handle.

2 Claims, 11 Drawing Figures

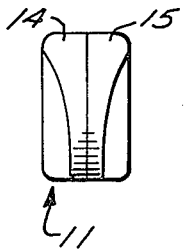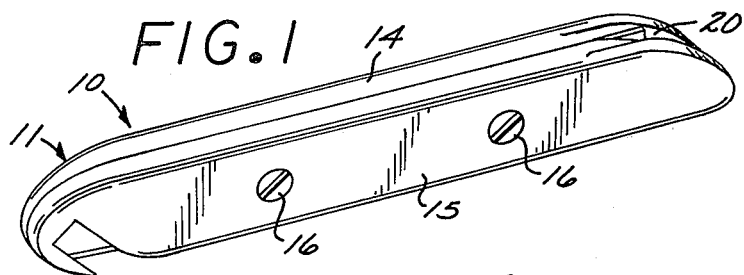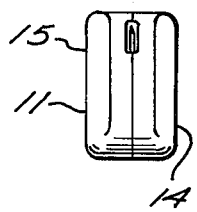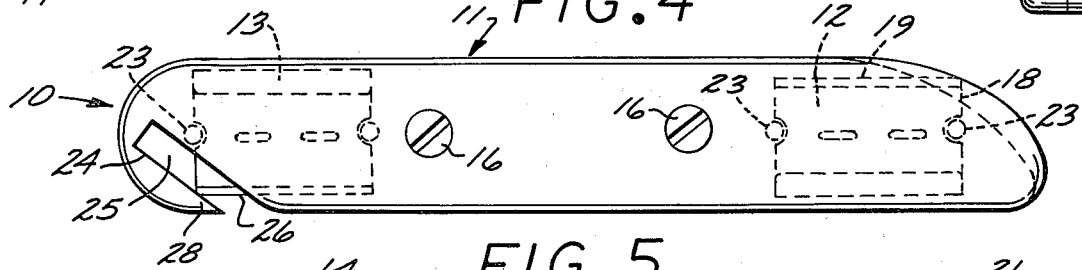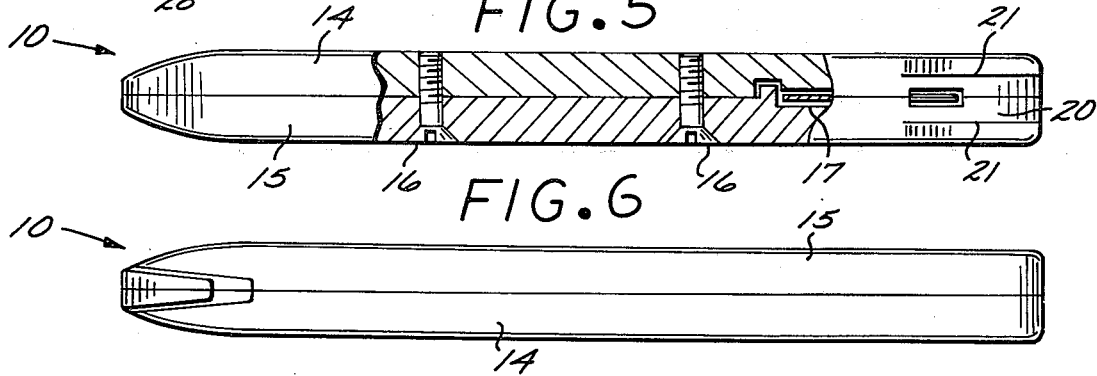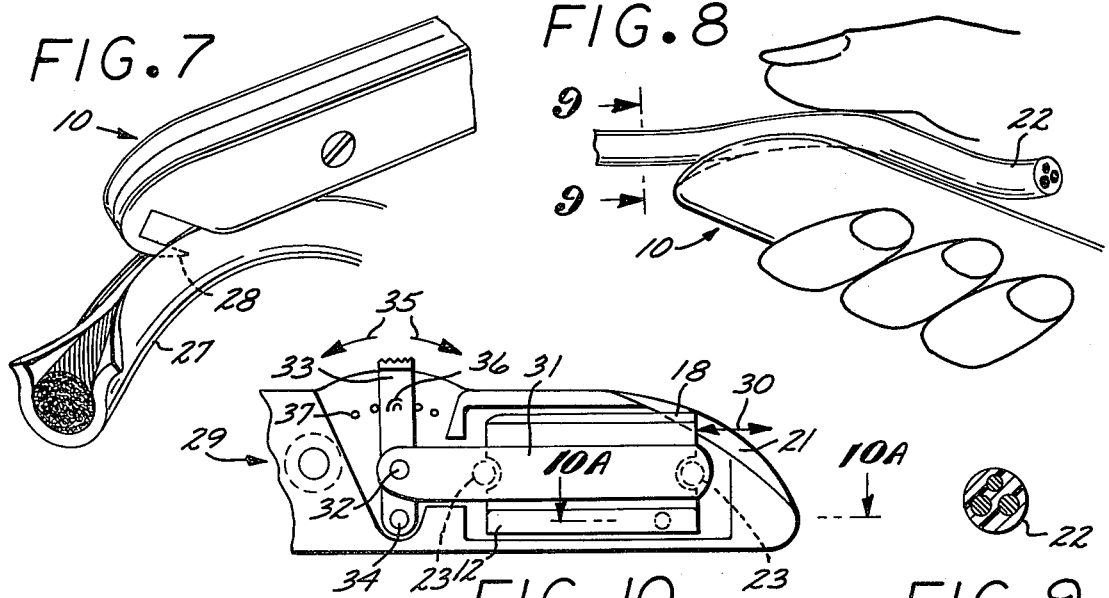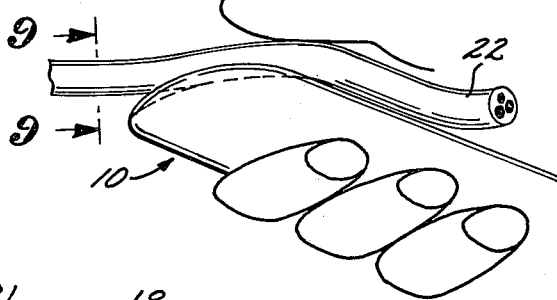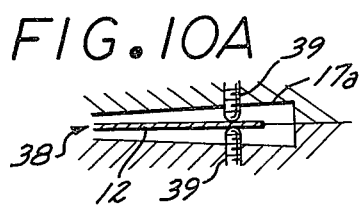

CABLE STRIPPER

This invention relates generally to tools used for slitting and stripping insulation from sheathed electric wires.

It is well known that numerous tools for slitting and stripping electric wiring have been developed. However, none of them include the advantageous features of the present invention.

It is a principal object of the present invention to provide a cable stripper, that slits the binder or sheathing of cables containing five or more inner cables of coaxial type, or larger cables containing paper-wrapped wires that need to be exposed for connection purposes.

Another object of the present invention is to provide a hand tool, which also strips the sheathing from coaxial type cable.

Yet a further object is to provide a hand tool, which by performing both of these tasks, saves a considerable amount of time, by eliminating the need to handle two separate conventional tools, each of which accomplishes only one of these tasks.

Yet another further object is to provide a hand tool, which is small in size, so that it may be conveniently carried, and which is safe for preventing a user from cutting himself.

Other objects of the present invention are to provide a hand tool, which is simple in design, inexpensive to manufacture, rugged in construction, easy to use and efficient in operation.

These, and other objects, will be readily evident, upon a study of the following specification, and the accompanying drawing, wherein:

FIG. 1 is a perspective view of the invention;
FIG. 2 is an end elevational view thereof;
FIG. 3 is an opposite end elevational view thereof;
FIG. 4 is a side elevational view thereof;
FIG. 5 is a top plan view thereof, shown partly in cross-section;
FIG. 6 is a bottom plan view thereof;
FIG. 7 is a fragmentary perspective view of one end of the device, shown in operative use;
FIG. 8 is a fragmentary perspective view of an opposite end of the device, shown in operative use;
FIG. 9 is an enlarged cross-sectional view, taken on line 9—9 of FIG. 8;
FIG. 10 is a fragmentary side view of one end of the device, and illustrated with a front side plate removed, in order to show a modified design of the invention, in which the blade is made adjustable, by simply adding two small molded plastic parts, and
FIG. 10a is a cross-sectional view, taken on line 10a—10a of FIG. 10, and showing a design of the invention for selectively making the slit more tangentially, as wished.

Referring now to the drawing in greater detail, and more particularly, to FIGS. 1 through 9 thereof, at this time, the reference numeral 10 represents a cable stripper, according to the present invention, wherein there is an elongated handle 11, which supports a pair of conventional, single edge razor blades 12 and 13 at opposite ends thereof. The handle comprises a pair of right and left plastic handle members 14 and 15, which are placed alongside each other, and secured together by a pair of screws 16; the razor blades each being held in a relief 17, formed between the handle members.

The blade 12, used for slitting, has one end 18 of its cutting edge 19 protruding outwardly from between the handle members, and into a recess 20 formed by abutting notches 21, at one end of the handle members. The recess is of such width that a cable 22 may be slid therein, as shown in FIG. 8. The amount of the blade protrusion into the recess is such that it slits only the cable sheath down to the surface of the wires contained in the sheath, without cutting the wires themselves. A pair of protrusions 23, molded on one of the handle members, precisely positions the blade inside the relief.

The blade 13, used for stripping the sheathing from the wires, is located at an opposite end of the handle, where each handle member has an angular notch 24, so as, together, to form a groove 25 that exposes a narrow portion 26 of the blade cutting edge, so as to cut any sheathing that is draped across the groove and the blade cutting edge. The blade is likewise precisely positioned between protrusions 23.

As shown in FIG. 7, the blade 13 also serves for slitting large cable 27. For this reason, the corners 28 of the handle, which are located adjacent the groove, are made wedge-shaped, so as to allow the corners to enter into the slit being formed by the blade.

In a modified design 29 of the invention, shown in FIG. 10, the blade 12 is slidably supported on the handle, as shown by arrow 30, so that the blade cutting edge end 18 can protrude either more or less, as desired, in order to slit different thicknesses of cables. This is accomplished by the blade-supporting protrusions 23 being made on a bar 31, connected by a pin 32 to a lever 33 pivoted at one end on pin 34 affixed on one of the handle members. The other end of the lever has a button for being manually pushed in either direction, as indicated by arrows 35. A detent 36 on the lever is engagable in either one of holes 37 on the handle member, so as to hold the lever selectively in a preferred position.

In a further modified design 38, shown in FIG. 10a, the blade 12 is additionally sidewardly adjustable, by means of a set screw 39 in each handle member, and between which the blade is held captive. By adjusting both the set screws, the blade is sidewardly shifted. As shown, the blade relief 17a is made deeper, so as to accommodate this shift. Such blade shifting allows slits to be made tangentially closer to a side edge of the sheathing, instead of along a center thereof.

While various changes may be made in the detail construction, it is understood that such changes will be within the spirit and scope of the present invention, as is defined by the appended claims.

What is claimed as new is:

1. In combination with first and second convention single edge razor blades, a hand tool in which said first and second blades are so mounted that an outer plastic sheath on an electrical cable may be engaged and slit by a single longitudinal movement of the tool relative to said cable to expose portions of a plurality electric conductors situated within said sheath that have plastic coatings extending therearound that may be sequentially removed by longitudinally slitting said coatings with said hand tool, said tool including:

a. a pair of elongate rigid members that have first and second end portions, said pair of rigid members disposed side by side with said first and second razor blades situated in cutting positions between said first and second end portions, said first end portions defining a downwardly and rearwardly extending hook that is separated from the balance of said pair of members by a transverse space that is spanned by said first razor blade, said hook serving to engage an end of said sheath and force said first blade into slitting engagement with said sheath as said tool is moved longitudinally away from said end, and said second end portion-s defining a longitudinal groove therebetween into which said second razor blade extends to slit said plastic coatings on said electrical conductors as each of said conductors is moved logitudinally through said groove; and b. means for removably supporting said first and second elongate rigid members side by side with said first and second razor blades situated therebetween.

2. A tool as defined in claim 1 in which said means are a plurality of transverse screws that extend between said pair of elongate members and removably engage the latter.

* * * * *